US008044999B2

(12) United States Patent  
Mullen et al.

(10) Patent No.: US 8,044,999 B2
(45) Date of Patent: Oct. 25, 2011

(54) IMAGE ENHANCER FOR DETECTING AND IDENTIFYING OBJECTS IN TURBID MEDIA

(75) Inventors: Linda J. Mullen, Chesapeake Beach, MD (US); Alan E. Laux, Great Mills, MD (US); Brandon Cochenour, Great Mills, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1267 days.

(21) Appl. No.: 11/726,202

(22) Filed: Mar. 6, 2007

(65) Prior Publication Data

US 2008/0219584 A1 Sep. 11, 2008

(51) Int. Cl.
*A62B 1/04* (2006.01)
(52) U.S. Cl. .............................. 348/67; 348/81; 348/161
(58) Field of Classification Search .................... 709/67, 709/81, 131; 348/67, 81, 131
See application file for complete search history.

(56) References Cited

U.S. PATENT DOCUMENTS

| | | | | |
|---|---|---|---|---|
| 4,935,616 A | * | 6/1990 | Scott ........................ | 250/214 VT |
| 5,091,778 A | * | 2/1992 | Keeler ............................ | 348/31 |
| 5,822,047 A | * | 10/1998 | Contarino et al. ........... | 356/5.01 |
| 5,963,658 A | | 10/1999 | Klibanov et al. | |
| 6,041,248 A | * | 3/2000 | Wang ............................ | 600/407 |
| 6,208,415 B1 | * | 3/2001 | De Boer et al. ................ | 356/450 |
| 6,738,653 B1 | * | 5/2004 | Sfez et al. ...................... | 600/322 |
| 7,006,676 B1 | | 2/2006 | Zeylikovich et al. | |
| 7,761,139 B2 | * | 7/2010 | Tearney et al. ............... | 600/473 |
| 7,804,518 B2 | * | 9/2010 | Schechner et al. .............. | 348/81 |

OTHER PUBLICATIONS

L.Mullen, A.Laux, B.Concannon, E.P.Zege, I.L.Katsev, A.S. Prikhach; Amplitude-modulated laser imager; Applied Optics, Jul. 1, 2004; vol. 43, No. 19; p. 3874-3892.
M.E.Zevallos, S.K.Gayen, M.Alrubaiee, R.R.Alfano;Time-gated backscattered ballistic light imaging of objects in turbid water; Applied Physics Letters, 86, Nov. 1, 2004.

* cited by examiner

*Primary Examiner* — Liangche A Wang
(74) *Attorney, Agent, or Firm* — Mark O. Glut

(57) ABSTRACT

An image enhancer that includes a laser for emitting an optical signal toward an object in a turbid medium, a modulator for modulating laser intensity of the optical signal, an RF source for driving the modulator and for providing a reference signal, an optical detector for detecting the modulated optical signal that is reflected from the object, the optical detector converting the reflected optical signal into an electrical signal, the electrical signal having RF and DC components, an I/Q demodulator for mixing the RF component of the electrical signal with the reference signal and producing in-phase and quadrature phase signal components that can be digitized and processed such that both contrast and range images of the object are produced.

14 Claims, 6 Drawing Sheets

IMAGE ENHANCER FOR DETECTING AND IDENTIFYING OBJECTS IN TURBID MEDIA

STATEMENT OF GOVERNMENT INTEREST

The invention described herein may be manufactured and used by or for the Government of the United States of America for governmental purposes without payment of any royalties thereon or therefor.

BACKGROUND

The present invention relates to an image enhancer for detecting and identifying objects in turbid media. More specifically, but without limitation, the present invention relates to a laser system that can detect and identify objects in turbid media.

Laser systems have been and are continuing to be developed to detect and identify objects in turbid media (examples of turbid media include, but without limitation, seawater, clouds, and tissue). Operating a laser imaging system in such an environment is challenging due to the fact that light is both absorbed and scattered. Although the optical wavelength is typically selected to minimize absorption, the scattering experienced by an optical signal can severely degrade image quality. In highly turbid media, there may be plenty of light scattered back from the object of interest, but it is buried in the signal returning from the surrounding environment. A method for separating the unscattered (or minimally scattered) image bearing photons from the scattered, background light can be used to improve object detection and identification.

Several techniques have been developed for reducing the detrimental effects of scattered light. These approaches can be categorized according to the type of laser source and receiver combination and the scanning method used to create the image. All these types of systems are capable of creating an image, whether it is a synchronously scanned narrow beam and a narrow receiver field of view (narrow-narrow) or a flood-illuminated scene with a multiple pixel receiver (wide-narrow). The decision as to which configuration provides the best performance depends directly on the task at hand (i.e., above-water or below-water operation, size and depth of underwater object, water optical properties, etc.).

One type of known system is the Laser Line Scan (LLS) system. The Laser Line Scan (LLS) system includes a well-collimated continuous wave source and a narrow field of view receiver that are synchronously scanned over the object of interest. The bistatic configuration limits the common volume created by the source and receiver field of view overlap and reduces the contribution from scattered light. However, since the system uses a continuous wave source, no inherent time (depth) information is present in the detected signal, and post-processing using triangulation methods must be used to obtain object range information.

Pulsed laser sources are also used in several underwater laser-imaging systems to temporally discriminate against scattered light and to provide object range information. In the operation of a typical range-gated imaging system, a short (10-20 nsec) pulse is transmitted to a distant object, and the receiver is timed to open only when the reflected light returns from the object. A typical configuration is broad-beam illumination of the scene and a gated intensified camera receiver, although systems using photomultiplier tube receivers in both single and multiple pixel configurations have also been utilized. The Streak Tube Imaging Lidar (STIL) uses a pulsed laser transmitter in a 'scannerless' configuration. Instead of scanning the laser beam, a fan of light is used to illuminate a volume of water. The streak tube receiver can measure both the amplitude and range (time) of the collected slit of light, and a three-dimensional image is created when the system is operated from a moving platform. While the range-gated and STIL approaches are effective in minimizing background light, the sensitivity is ultimately limited by small-angle forward scattered light that induces image blurring.

Another type of underwater imager encompasses those that use temporal modulation of the transmitted light and subsequent synchronous detection of the modulation envelope at the receiver. The Underwater Scannerless Range Imager (USRI) uses a radio frequency modulation source that is coupled to both the timing of the laser transmitter and the gain of the image intensified CCD receiver. Object range information is obtained by measuring the phase difference between the transmitted and reflected signals simultaneously for each pixel of the receiver. However, multiple frames are required using different modulation schemes in order to extract the range information and to differentiate changes due to range variations from those due to intensity variations in the scene. Previous configurations used continuous wave sources, but a recent configuration implements a pulsed source and a range-gated receiver to minimize the volumetric backscatter signal.

Researchers at the Naval Air Systems Command (NAVAIR) are also developing a system that uses temporal modulation of the transmitted optical signal. However, in this approach, the optical receiver consists of a photodetector with sufficient bandwidth to recover the modulation envelope encoded on the optical signal. The resulting radio frequency signal is then processed using traditional radar signal processing techniques. This approach reduces the contribution by volumetric backscatter by using a modulation frequency that becomes strongly decorrelated with respect to the transmitted signal due to multiple scattering. A gain in image contrast is achieved when the modulation envelope emanating from an underwater object remains coherent relative to the original modulation signal. The phase information encoded on the detected modulation signal is processed to obtain object range information.

In previous embodiments of this modulated imaging system approach, a spectrum analyzer was used to produce the signal and the system produced a so-called "magnitude" image that was shown to have a nonlinear dependence on the object albedo (the term albedo may be defined, but without limitation, as ratio of the amount of electromagnetic energy reflected by a surface to the amount of energy incident upon it or the fraction of radiation striking a surface that is reflected by that surface). This non-linearity created a variety of sometimes unexpected features, such as contrast inversion, appearance of false elements in the image patterns, and the "emphasizing of the outlines" in object albedo patterns. In this system configuration, the irradiance distribution in the image plane is not proportional to the actual reflectivity of the object, the image is distorted, and its identification is difficult if impossible. This non-linearity is the main drawback of the conventional "magnitude" signal registration of previous system configurations.

For the foregoing reasons, there is a need for an image enhancer for detecting and identifying objects in turbid media.

SUMMARY

The present invention is directed to an image enhancer that meets the needs enumerated above and below.

The present invention is directed to an image enhancer for detecting and identifying objects in turbid media. The image enhancer includes a laser for emitting an optical signal toward an object in a turbid medium, a modulator for modulating laser intensity of the optical signal, a radio frequency (RF) source for driving the modulator and for providing a reference signal, an optical detector for detecting the modulated optical signal that is reflected from the object, the optical detector converting the reflected optical signal into an electrical signal, the electrical signal having RF and direct current (DC) components, an in-phase and quadrature (I/Q) demodulator for mixing the RF component of the electrical signal with the reference signal and producing in-phase and quadrature phase signal components that can be filtered, digitized, and processed such that both contrast and range images of the object are produced.

It is a feature of the present invention to provide an image enhancer that provides a clearer image of an object in turbid media.

It is a feature of the present invention to provide an image enhancer wherein the image is linear with respect to the object albedo.

It is a feature of the present invention to provide an image enhancer wherein the phase of the RF reference signal is matched to the backscatter phase.

It is a feature of the present invention to provide an image enhancer wherein modulation frequency is chosen so that the backscatter and subject signals can be analyzed separately at the receiver.

DRAWINGS

These and other features, aspects and advantages of the present invention will become better understood with reference to the following description and appended claims, and accompanying drawings wherein:

DESCRIPTION

Figure 1:
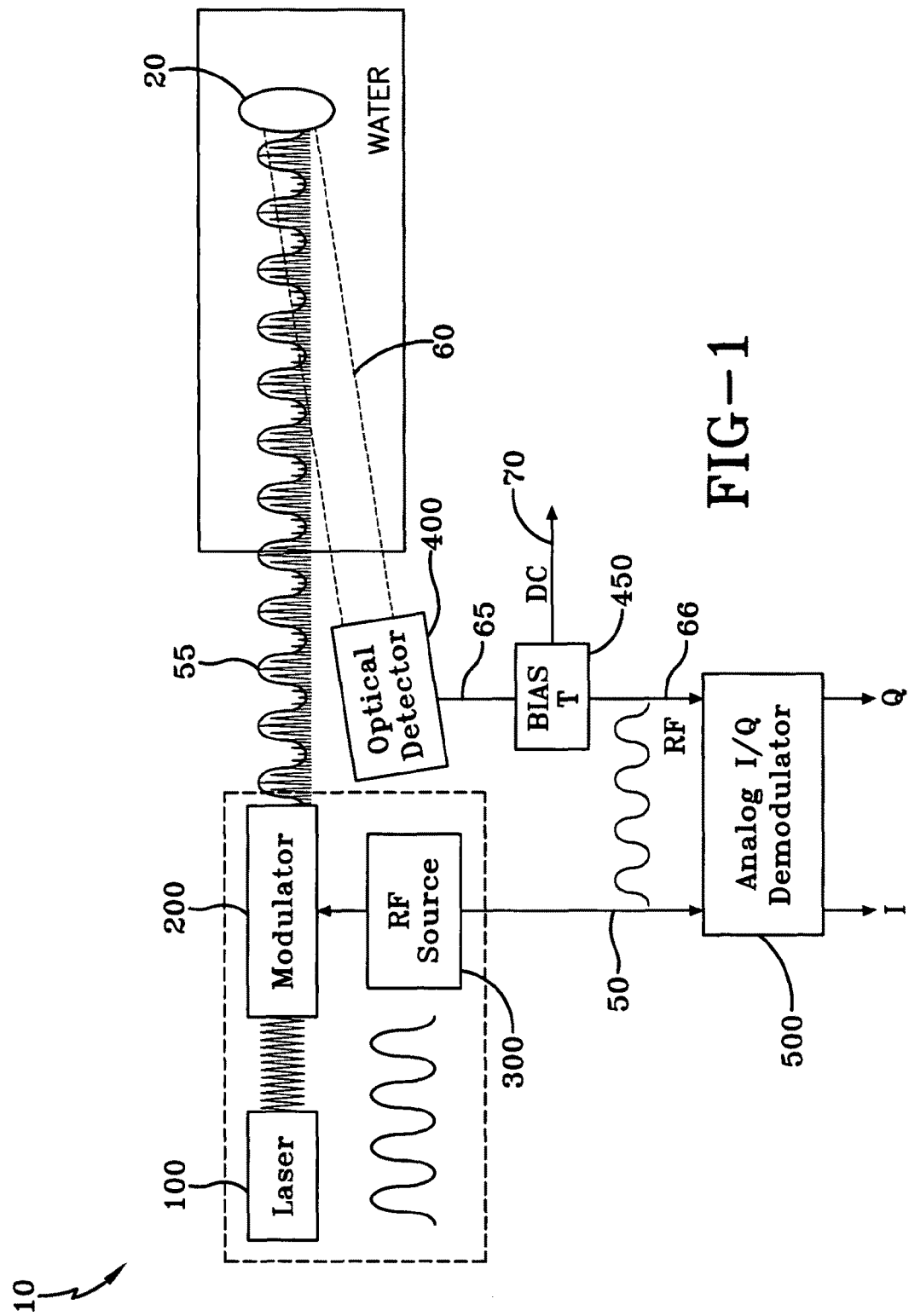
FIG. 1 is an embodiment of the image enhancer in operation.
Figure 2:
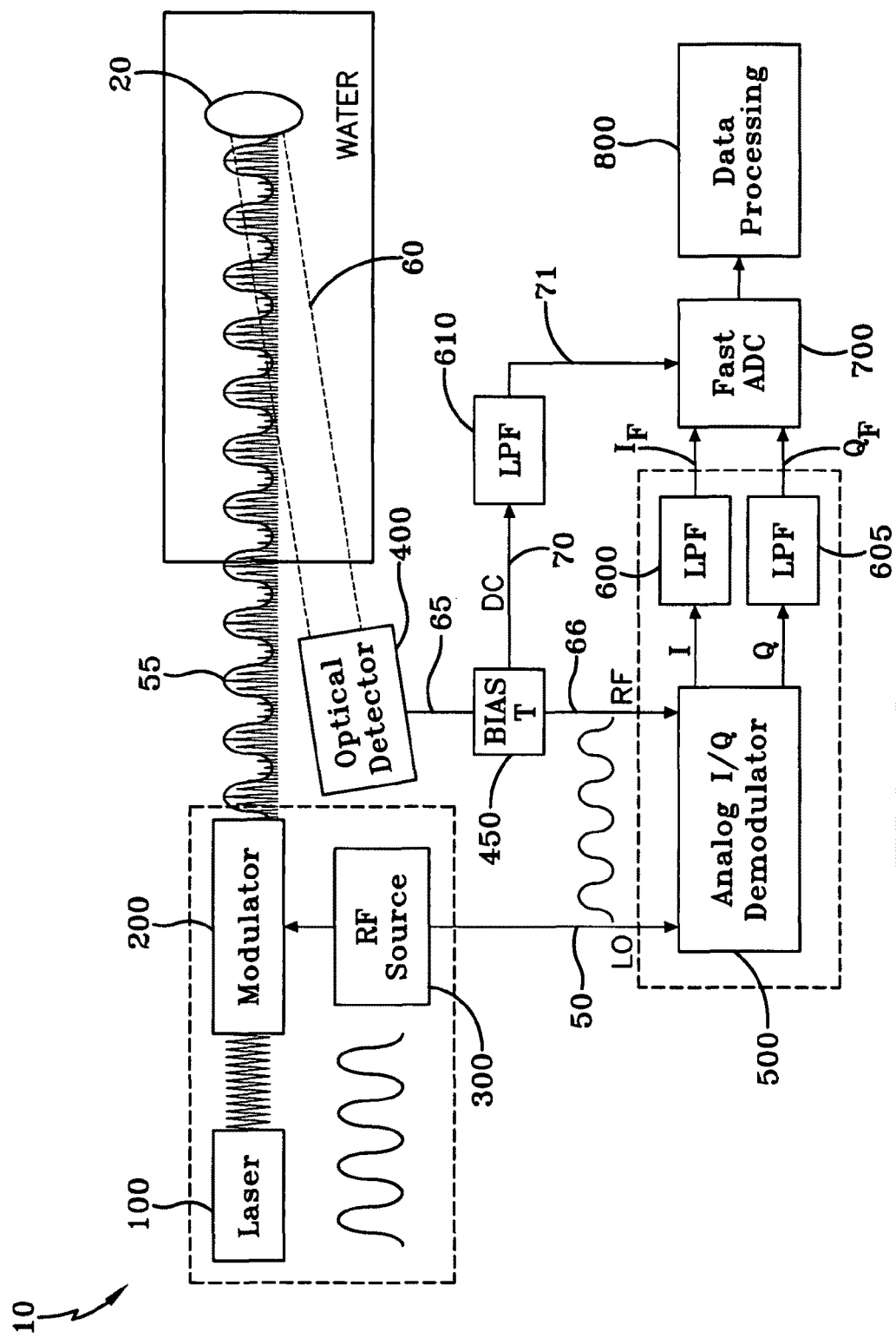
FIG. 2 is another embodiment of the image enhancer in operation.

The preferred embodiments of the present invention are illustrated by way of example below and in FIGS. 1-8. As seen in FIG. 1, the image enhancer 10 for detecting and identifying objects in turbid media includes a laser 100 for emitting an optical signal 55 toward an object 20 in a turbid medium (the medium in FIGS. 1 and 2 is water, however, the image enhancer 10 may be used in any type of turbid medium), a modulator 200 for modulating laser intensity of the optical signal 55, a radio frequency (RF) source 300 for driving the modulator 200 and for providing a reference signal 50, an optical detector 400 for detecting the modulated optical signal that is reflected from the object 20 (the reflected/detected optical signal 60), the optical detector 400 converting the reflected optical signal 60 into an electrical signal 65, a bias-T 450 for separating the electrical signal 65 into an RF component 66 and a DC component 70, and an I/Q demodulator 500 for mixing the RF component 66 of the electrical signal 65 with the reference signal 50 and producing an in-phase signal component I and a quadrature phase signal component Q that can be filtered, digitized, and processed such that both contrast and range images of the object 20 are produced. As shown in FIGS. 1 and 2, the I/Q demodulator 500 may be analog; however, any type of I/Q demodulator 500 may be utilized, as practicable.

In the description of the present invention, the invention will be discussed in a turbid environment, specifically water; however, this invention can be utilized for any type of need that requires use of an image enhancer. The image enhancer 10 may be used, but without limitations, in military operations, search missions, and biomedical imaging in tissue.

As shown in FIG. 2, the preferred embodiment of the image enhancer 10 includes a first low pass filter 600 and a second low pass filter 605. The in-phase signal component (I) may pass through the first low pass filter 600 and the quadrature phase signal component (Q) may pass through the second low pass filter 605, so that any high frequency components may be removed from the two components. The image enhancer 10 may include a fast analog-to-digital converter 700 and a data processor 800. The filtered signals ($I_F$ and $Q_F$) may be digitized by the analog-to-digital converter 700 and then processed by the data processor 800. The data processor 800 produces contrast and range images of the object 20. The data processor 800 utilizes the individual in-phase signal component (I) and the quadrature phase signal component (Q) when producing the images.

In another embodiment of the invention, the DC component 70 of the electrical signal 65 is passed through a third low pass filter 610. The filtered DC component 71 may then be digitized simultaneously with the filtered in-phase signal component $I_F$ and the filtered quadrature phase signal component $Q_F$. The filtered DC component 71 is indicative of the baseline performance of an imager without modulation and is used for comparison purposes.

Figure 3:
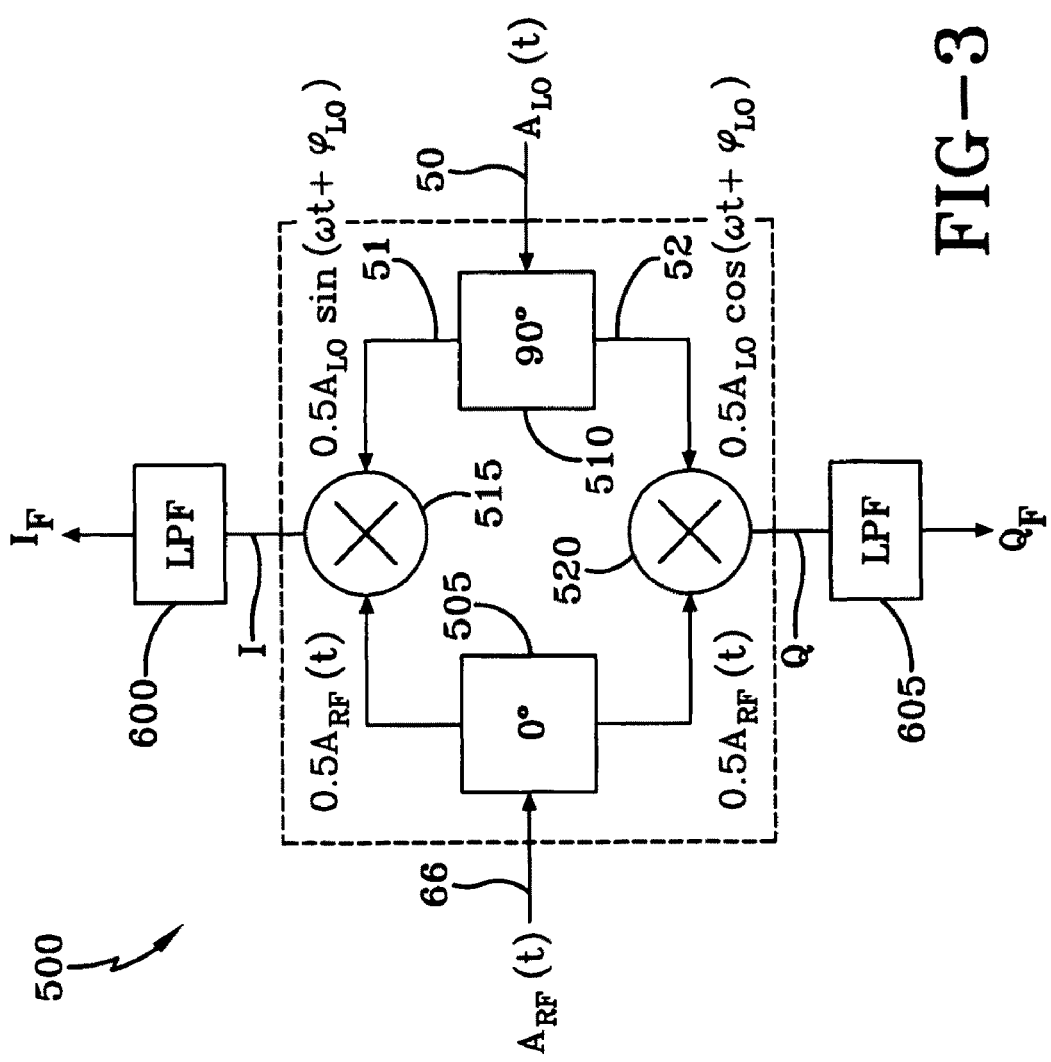
FIG. 3 is an embodiment of the I/Q demodulator in operation.

The operation of the preferred I/Q demodulator 500 can be best described by referring to FIG. 3. In FIG. 3, the signal components shown are representative of those encountered when operating the system in an underwater environment. The RF component 66 of the electrical signal 65, $A_{RF}(t)$, has two components—one which is due to the object of interest or target, $A_{OBJ}(t)$, and one which is due to the backscatter or background signal, $A_{BSN}(t)$. The RF component 66 of the electrical signal 65 may be represented by the following equations:

$$A_{RF}(t) = A_{OBJ}(t) + A_{BSN}(t) \quad \text{(Equations 1 and 2)}$$
$$= A_{OBJ}\sin(\omega t + \varphi_{OBJ}) + A_{BSN}\sin(\omega t + \varphi_{BSN})$$

where $A_{OBJ}$ and $A_{BSN}$ are the amplitudes of the object signal and backscatter signal respectively, $\omega$ is the radial frequency, t is time, and $\phi_{OBJ}$ and $\phi_{BSN}$ are the corresponding phases of the object and background (in a given medium).

The I/Q demodulator 500 may also include a zero degree splitter 505, a ninety degree splitter 510, a first mixer 515 and a second mixer 520. The splitters and mixers may be digital, analog or any type practicable. The zero degree splitter 505 separates the $A_{RF}(t)$ signal (the RF component 66 of the electrical signal 65) into equal components (0.5 $A_{RF}(t)$) that are applied to the two different mixers (515 and 520). The reference signal 50 ($A_{LO}(t)$) produced by the RF source 300 is also input to the I/Q demodulator 500, and can be described by the following equation:

$$A_{LO}(t) = A_{LO} \sin(\omega t + \phi_{LO}),$$ (Equation 3)

wherein $A_{LO}$ is the amplitude of the reference signal 50, $\omega$ is the radial frequency, t is time, and $\phi_{LO}$ is the corresponding phase of the reference signal 50. The reference signal 50 is phase-locked to the radio frequency signal that is used to modulate the optical signal 55. The ninety degree splitter 510 separates the $A_{LO}(t)$ signal (the reference signal 50) into two components—an in-phase reference signal portion 51 and an out-of-phase reference signal portion 52. The in-phase reference signal portion 51 (described as $0.5 A_{LO} \sin(\omega t + \phi_{LO})$) is in-phase with the original $A_{LO}(t)$ signal or reference signal 50, and the out-of-phase reference signal portion 52 (described as $0.5 A_w \cos(\omega t + \phi_{LO})$) is ninety degrees out of phase with the original signal or reference signal 50. One of the in-phase components of the $A_{RF}(t)$ signal, (0.5 $A_{RF}(t)$), and the in-phase reference signal portion 51 ($0.5 A_{LO} \sin(\omega t + \phi_{LO})$) are mixed by the first mixer 515. The first mixer 515 may be a RF mixer. The output from the first mixer 515 may then be passed through the first low-pass filter 600 to produce the filtered in-phase signal component $I_F$. The following equation describes the filtered in-phase signal component $I_F$ (assuming a lossless I/Q demodulator and a lossless low pass filter):

$$I_F = 0.125 A_{LO} [A_{OBJ} \cos(\phi_{OBJ} - \phi_{LO}) + A_{BSN} \cos(\phi_{BSN} - \phi_{LO})].$$ (Equation 4)

The quadrature phase signal component Q is produced by mixing the other in-phase component of the $A_{RF}(t)$ signal (0.5 $A_{RF}(t)$) with the $A_{LO}(t)$ signal component that is ninety degrees out of phase (the out-of-phase reference signal portion 52 and it is described as $0.5 A_{LO} \cos(\omega t + \phi_{LO})$). The other in-phase component of the RF component 66 of the electrical signal 65 (0.5 $A_{RF}(t)$) and the out-of-phase reference signal portion 52 are mixed by the second mixer 520. The output from the second mixer 520 may then be passed through the second low-pass filter 605 to produce the filtered quadrature phase signal component $Q_F$. The following equation describes the filtered quadrature phase signal component $Q_F$ (assuming a lossless I/Q demodulator and a lossless low pass filter):

$$Q_F = 0.125 A_{LO} [A_{OBJ} \sin(\phi_{OBJ} - \phi_{LO}) + A_{BSN} \sin(\phi_{BSN} - \phi_{LO})].$$ (Equation 5)

The filtered in-phase signal component $I_F$ and the filtered quadrature phase signal component $Q_F$ are then digitized simultaneously by the analog-to-digital converter 700 and processed by the data processor 800, such that contrast and range images are produced.

The main advantage of using the I/Q demodulator 500 instead of a spectrum analyzer (or other types of components) used in previous system configurations can be understood by studying the equations relevant to the two receiver approaches. The signal that is captured when using the previous spectrum analyzer approach is the magnitude, M, of the detected RF signal (the detected signal 60):

$$M = \sqrt{I^2 + Q^2} \propto \sqrt{A_{OBJ}^2 + A_{BSN}^2 + 2 A_{OBJ} A_{BSN} \cos(\phi_{OBJ} - \phi_{BSN})}.$$ (Equation 6)

It is evident from Equation 6 that the magnitude is nonlinear with respect to the object return amplitude, $A_{OBJ}$, except when $\phi_{OBJ} - \phi_{BSN} = 0, \pi$. However, upon looking at Equations 4 and 5, it is clear that the filtered in-phase signal component $I_F$ and the filtered quadrature phase signal component $Q_F$ (as well as the unfiltered signal components) are linear with respect to $A_{OBJ}$. Furthermore, the reference signal phase, $\phi_{LO}$, can be varied to optimize the images produced with the filtered in-phase signal component $I_F$ and the filtered quadrature phase signal component $Q_F$. For example, when $\phi_{LO} = \phi_{BSN}$, $$I_F = 0.125 A_{LO} [A_{OBJ} \cos(\phi_{OBJ} - \phi_{BSN}) + A_{BSN}]$$

$$Q_F = 0.125 A_{LO} A_{OBJ} \sin(\phi_{OBJ} - \phi_{BSN}).$$ (Equations 7 and 8)

While the filtered in-phase signal component $I_F$ still contains both object ($A_{OBJ}$) and backscatter ($A_{BSN}$) amplitude components, the filtered quadrature phase signal component $Q_F$ contains only the object amplitude component, $A_{OBJ}$. Furthermore, if a modulation frequency is chosen so that the object and backscatter signals are ninety degrees out of phase ($\phi_{OBJ} - \phi_{BSN} = n\pi/2$, where n is an odd integer), then:

$$I_F = 0.125 A_{LO} A_{BSN}$$

$$Q_F = 0.125 A_{LO} A_{OBJ}.$$ (Equations 9 and 10)

In this case, the filtered in-phase signal component $I_F$ is dependent on the backscatter amplitude, and the filtered quadrature phase signal component $Q_F$ is directly proportional to the object amplitude. Therefore, this approach enables us to separate the object and backscatter signal components from the composite return signal. This was not possible with the previous inventions that measured only the return signal magnitude, which is independent of the reference signal phase and contains both object and backscatter components.

Figure 4:
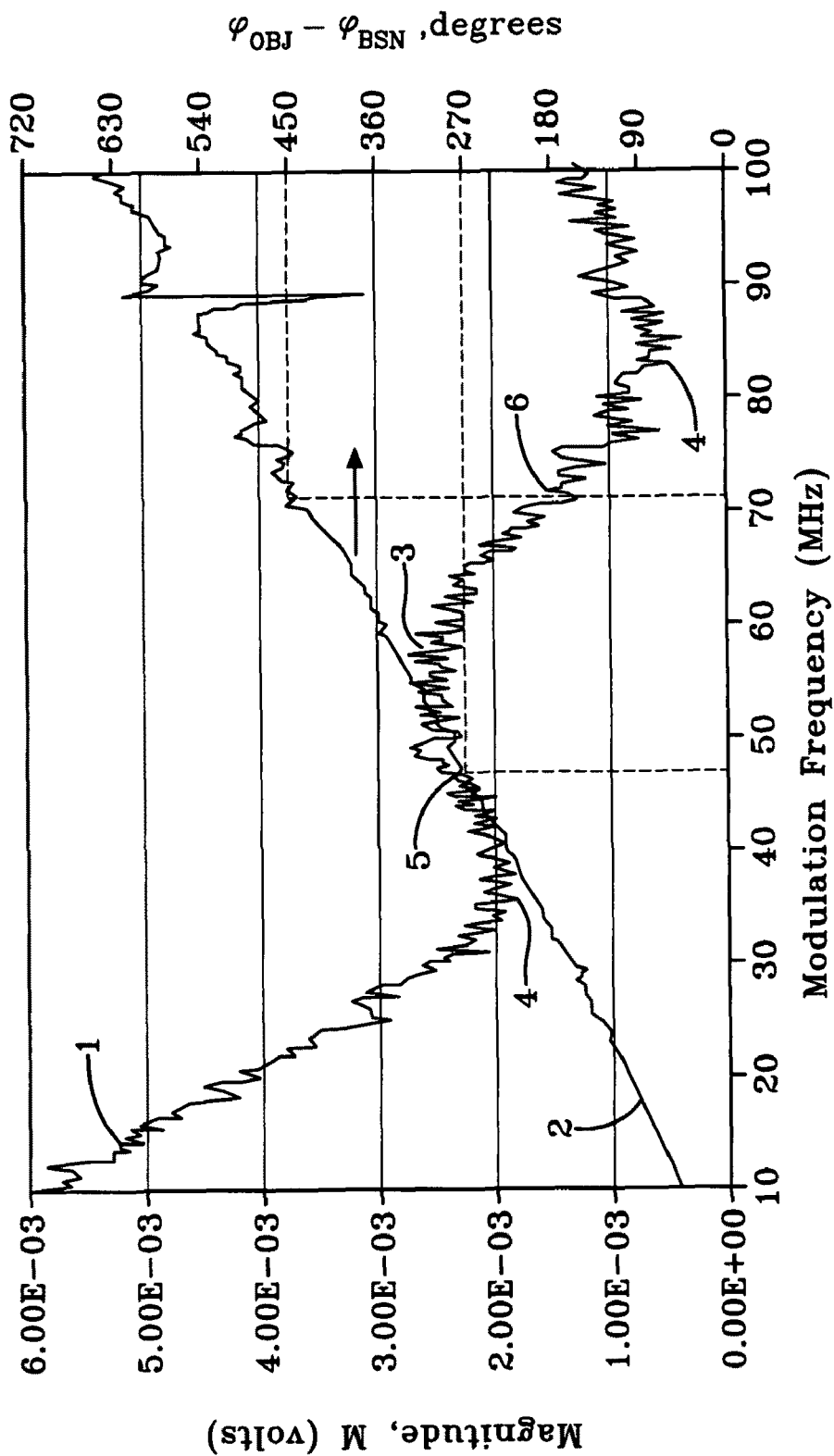
FIG. 4 is a plot showing the frequency dependence of the magnitude and object-backscatter phase difference.

The method for selecting the modulation frequency is based upon observing the frequency dependence of the magnitude of the RF signal, M(f). In the past, it was observed in both experimental and computer simulation results that under certain conditions, maxima and minima were observed in the dependence of M on the modulation frequency. The cause of these signal amplitude fluctuations as a function of modulation frequency was found to be due to constructive and destructive interference of the modulation envelope between the backscatter and object return signals. Therefore, the features of M(f) are dependent on the phase difference between the object and backscatter return signals, $\phi_{OBJ} - \phi_{BSN}$. This is shown in FIG. 4 where both M (described in Equation 6 and plotted as line 1 in FIG. 4) and $\phi_{OBJ} - \phi_{BSN}$ (plotted as line 2 of FIG. 4) are plotted as a function of modulation frequency (the backscatter phase was measured by removing the object from the water). The peak in M(f) (constructive interference) (shown as 3 in FIG. 4) is due to a object-backscatter phase difference of $\phi_{OBJ} - \phi_{BSN} = 0$. Similarly, the 'dips' in M(f) (destructive interference) (shown as 4 in FIG. 4) correspond to a object-backscatter phase difference of $\phi_{OBJ} - \phi_{BSN} = n\pi$, where n is an odd integer. In the past, the modulation frequency was selected so that it satisfied either of these conditions (i.e., constructive or destructive interference). However, in the current invention, the modulation frequency that satisfies the condition where $\phi_{OBJ} - \phi_{BSN} = n\pi/2$ (where n is an odd integer) is desired. These frequencies are those that lie between the two extremes (shown as 5 and 6 in FIG. 4). Furthermore, it is also desired to select a reference signal phase so that $\phi_{LO} = \phi_{BSN}$. If the object phase can be measured with another sensor, such as an acoustic altimeter, then the backscatter phase can be calculated by $\phi_{BSN} = \phi_{OBJ} - n\pi/2$ and the reference signal phase can be adjusted so that $\phi_{LO} = \phi_{BSN}$.

Figure 5:
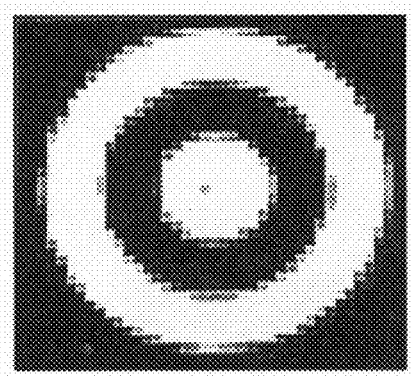
FIG. 5 is an image of an object used to obtain the experimental results shown in FIGS. 6, 7 and 8.
Figure 6:
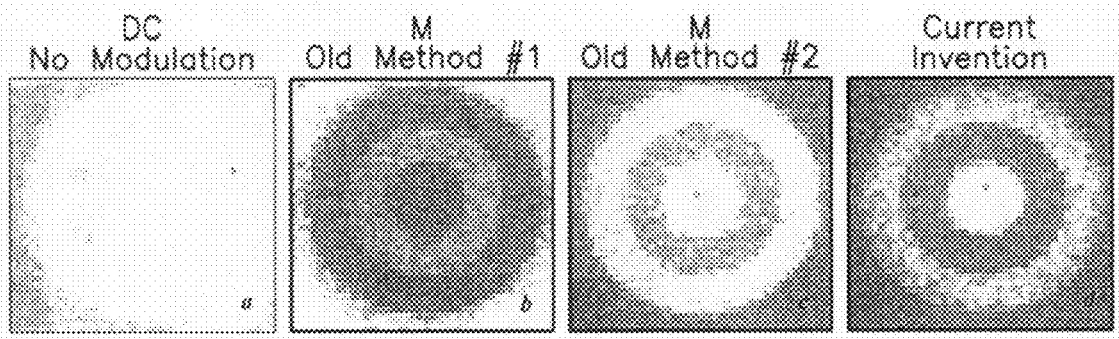
FIG. 6 is underwater images using a beam attenuation coefficient of 1.8 m$^{-1}$.
Figure 7:
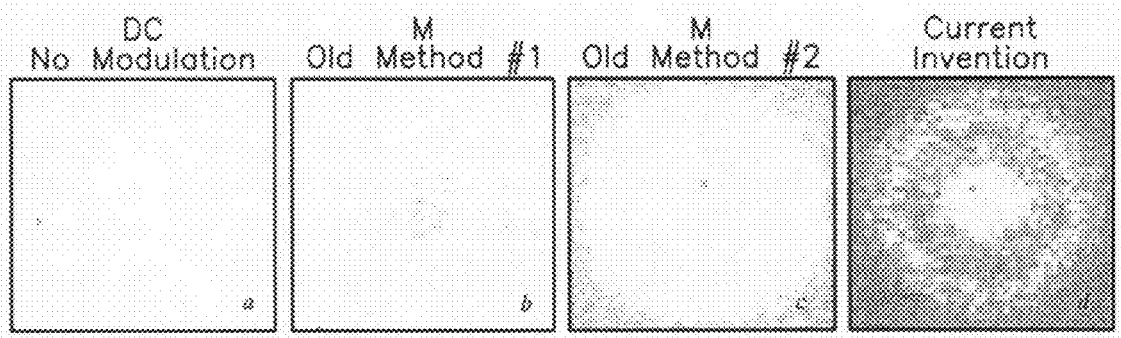
FIG. 7 is underwater images using a beam attenuation coefficient of 2 m$^{-1}$; and, FIG. 8a is the uncorrected range image computed using Equation 11.

To illustrate the advantages of the current invention, experimental results obtained using the old methods and the current invention will now be compared. The results obtained without modulation will also be shown to provide a baseline performance level. The target or object 20 used for these measurements was a flat piece of metal with a 'bulls eye' pattern and is shown in FIG. 5. In FIG. 6, the image results are shown for a target at a depth of 2.8 m in water with a beam attenuation coefficient of 1.8 m$^{-1}$. The image obtained using the DC signal (with no modulation) is shown in the first panel of FIG. 6, and has reduced black/white contrast relative to the above-water target (shown in FIG. 5). The images obtained using previously known methods (using the magnitude of the return signal), shown in the second and third panels of FIG. 6, have improved contrast relative to the DC image. However, the image corresponding to a destructive interference condition has a contrast that is inverted (i.e., the black part appears white and the white part appears black). The image obtained using the present invention (fourth panel of FIG. 6) has a better contrast than utilizing the previously known methods. Another set of results obtained in slightly more turbid water (beam attenuation coefficient was 2 m$^{-1}$) is shown in FIG. 7. Here the advantage of the present invention is even much more evident. The first panel of FIG. 7 shows an image obtained with no modulation, the second and third panels of FIG. 7 show images obtained using previously known methods, while the fourth panel of FIG. 7 shows the image obtained utilizing the present invention.

An additional advantage of the new approach is that it has the potential to enhance the accuracy of the phase calculated from the in-phase signal component I and the quadrature phase signal component Q:

$$\phi_{RF} - \phi_{LO} = \tan^{-1}(Q/I) \quad \text{(Equation 11)}$$

where $\phi_{RF}$ is the phase of the composite return signal and $\phi_{LO}$ is the reference signal phase. This phase measurement capability is useful when imaging three-dimensional objects where $\phi_{OBJ}$ varies as a function of position across the object surface. However, upon examination of the equations of the filtered in-phase signal component $I_F$ and the filtered quadrature phase signal component $Q_F$ (Equations 4 and 5), it is clear that there are two phase terms: one for the object, $\phi_{OBJ} - \phi_{LO}$, and one for the backscatter, $\phi_{BSN} - \phi_{LO}$. To isolate the object phase term, the effect of the backscatter must be removed. This can be accomplished using the new approach described previously. By selecting a reference point so that $\phi_{LO} = \phi_{BSN}$ and $\phi_{BSN} - \phi_{OBJ} = n\pi/2$ (for odd integer n), the backscatter phase term is removed and the backscatter amplitude can be determined (Equations 9 and 10). The object phase can then be calculated by $$\varphi_{OBJ} - \varphi_{LO} = \quad \text{(Equation 12)}$$
$$\tan^{-1}\left(\frac{Q_F(\varphi_{LO} = \varphi_{BSN})}{I(\varphi_{LO} = \varphi_{BSN}) - I_F\left(\varphi_{OBJ} - \varphi_{BSN} = n\frac{\pi}{2}\right)}\right).$$

Figure 8:
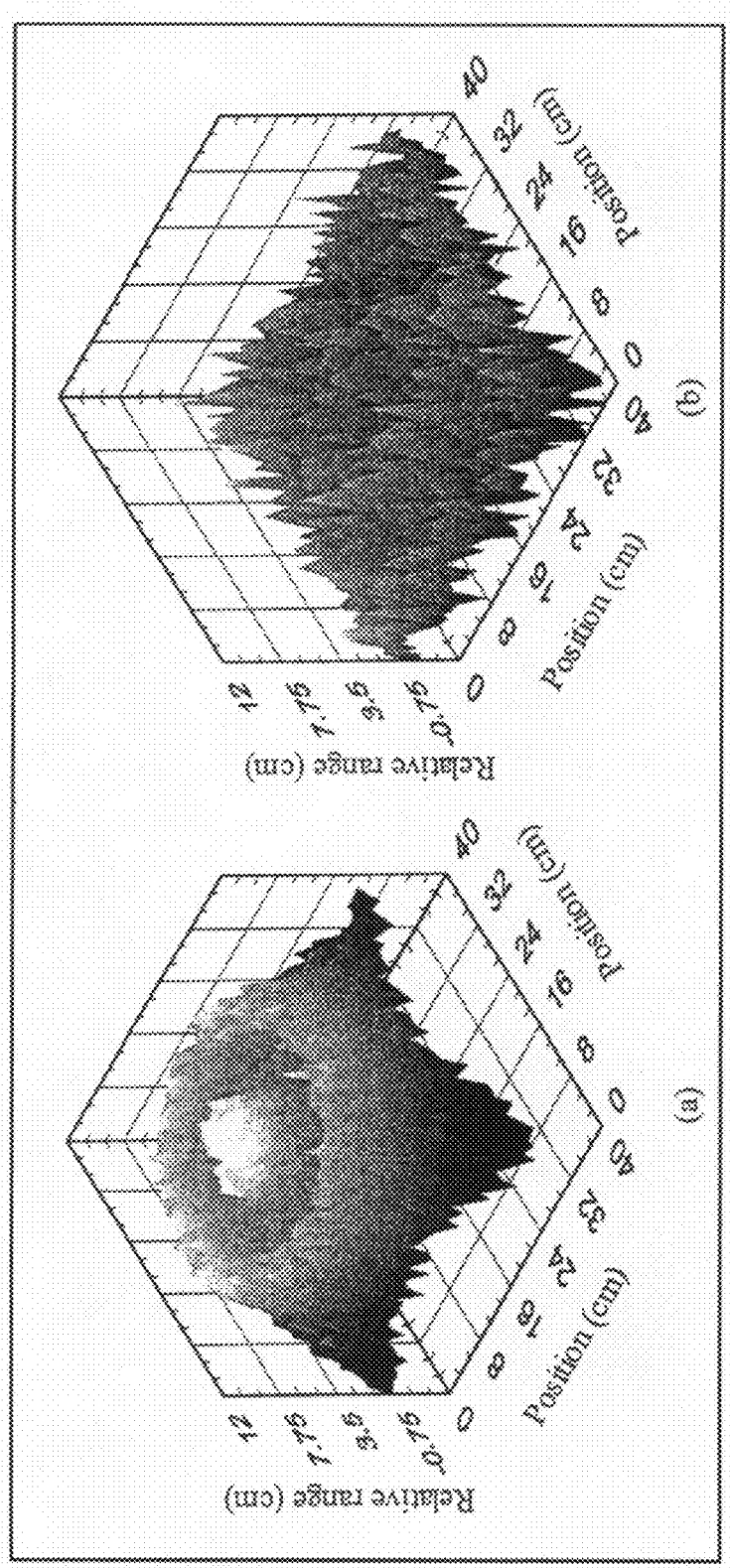
FIG. 8b is the corrected range image computed using Equation 12.

The range measurements calculated using Equations 11 and 12 for the flat target (the object 20) images shown in FIG. 5 are shown in FIG. 8. The uncorrected range image (FIG. 8a) illustrates the effect of the backscatter in producing phase errors. The corrected range image (FIG. 8b) shows that the erroneous features have been removed and the image more closely resembles that of a flat target.

The method for detecting and identifying objects in turbid media includes emitting an optical signal toward an object in a turbid medium, modulating the optical signal, providing a reference signal, detecting a portion of the modulated optical signal that is reflected from the object, converting the portion of the modulated optical signal into an electrical signal, separating the electrical signal into its RF and DC components, mixing the RF component of the electrical signal with the reference signal, producing an in-phase signal component and a quadrature phase signal component from the mixed signals, and filtering, digitizing and processing the in-phase signal component and the quadrature phase signal component such that contrast and range images of the object are produced.

In the preferred embodiment of the method, the in-phase signal component and the quadrature phase signal component are filtered prior to being digitized and processed. Additionally, the method may include separating the reference signal into an out-of-phase reference signal portion and to an in-phase reference signal portion, mixing half of the RF component of the electrical signal with the out-of-phase reference signal portion such that the quadrature phase signal component is produced, and mixing the other half of the RF component of the electrical signal with the in-phase reference signal portion such that the in-phase signal component is produced. The preferred method utilizes the above described equations and calculations.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to a certain preferred embodiments thereof, other embodiments are possible. Therefore, the spirit and scope of the appended claims should not be limited to the description of the preferred embodiment(s) contained herein.

What is claimed is:

1. An image enhancer for detecting and identifying objects in turbid media, the image enhancer comprising:
   a laser for emitting an optical signal toward an object in a turbid medium;
   a modulator for modulating laser intensity of the optical signal;
   a radio frequency (RF) source for driving the modulator and for providing a reference signal;
   an optical detector for detecting a portion of the modulated optical signal that is reflected from the object, the optical detector converts the detected portion of the modulated optical signal into an electrical signal, the electrical signal having a RF component and a direct current (DC) component; and,
   an in-phase and quadrature (I/Q) demodulator for mixing the RF component of the electrical signal with the reference signal and producing an in-phase signal component and a quadrature phase signal component that can be filtered, digitized and processed such that both contrast and range images of the object are produced.

2. The image enhancer of claim 1, wherein the electrical signal further having an object of interest component and a backscatter component.

3. The image enhancer of claim 2, wherein the RF component of the electrical signal ($A_{RF}(t)$) may be described by the following equation:

$$A_{RF}(t) = A_{OBJ}(t) + A_{BSN}(t)$$
$$= A_{OBJ}\sin(\omega t + \varphi_{OBJ}) + A_{BSN}\sin(\omega t + \varphi_{BSN})$$

wherein $A_{OBJ}(t)$ is the object of interest component, $A_{BSN}(t)$ is the backscatter component, $A_{OBJ}$ and $A_{BSN}$ are the amplitudes of the object of interest component and the backscatter component, the $\phi_{OBJ}$ and $\phi_{BSN}$ are the corresponding phases of the object of interest component and the backscatter component, and $\omega$ is the radial frequency and t is time.

4. The image enhancer of claim 1, wherein the I/Q demodulator includes a zero degree splitter for separating the RF component of the electrical signal into equal components.

5. The image enhancer of claim 4, wherein the I/Q demodulator further includes a ninety degree splitter for separating the reference signal into an out-of phase reference signal portion and an in-phase reference signal portion.

6. The image enhancer of claim 5, wherein the I/Q demodulator further includes a first mixer and a second mixer, the in-phase reference signal portion and half of the RF component of the electrical signal are mixed by the first mixer such that the in-phase signal component is produced, the out-of-phase reference portion and the other half of the RF component of the electrical signal is mixed by the second mixer such that the quadrature phase signal component is produced.

7. An image enhancer for detecting and identifying objects in turbid media, the image enhancer comprising:
   a laser for emitting an optical signal toward an object in a turbid medium;
   a modulator for modulating laser intensity of the optical signal;
   a radio frequency (RF) source for driving the modulator and for providing a reference signal;
   an optical detector for detecting a portion of the modulated optical signal that is reflected from the object, the optical detector converting the detected portion of the modulated optical signal into an electrical signal, the electrical signal having a RF component and a direct current (DC) component;
   a bias-T for separating the electrical signal into RF and DC components;
   an in-phase and quadrature (I/Q) for mixing the RF component of the electrical signal with the reference signal and producing an in-phase signal component and a quadrature phase signal component that can be filtered, digitized and processed such that both contrast and range images of the object are produced;
   a first low pass filter; and,
   a second low pass filter, the in-phase signal component passing through the first low pass filter prior to being digitized, the quadrature phase signal component passing through the second low pass filter prior to being digitized.

8. The image enhancer of claim 7, wherein the image enhancer further includes an analog-to-digital converter for digitizing the filtered in-phase signal component and the filtered quadrature phase signal component.

9. The image enhancer of claim 8, wherein the image enhancer further includes a data processor for taking the digitized filtered in-phase signal component and the digitized filtered quadrature phase signal component and converting them into contrast and range images of the object.

10. The image enhancer of claim 9, wherein the DC component of the electrical signal is digitized by the analog-to-digital converter simultaneously with the in-phase signal component and the quadrature phase signal component.

11. The image enhancer of claim 10, wherein the image enhancer further includes a third low pass filter, the DC component of the electrical signal passing through the third low pass filter prior to entering the analog-to-digital converter.

12. The image enhancer of claim 11, wherein the I/Q demodulator includes a zero degree splitter for separating the RF component of the electrical signal into equal components.

13. The image enhancer of claim 12, wherein the I/Q demodulator further includes a ninety degree splitter for separating the reference signal into an out-of phase reference signal portion and an in-phase reference signal portion.

14. The image enhancer of claim 13, wherein the I/Q demodulator further includes a first mixer and a second mixer, the in-phase reference signal portion and half of the RF component of the electrical signal are mixed by the first mixer such that the in-phase signal component is produced, the out-of-phase reference signal portion and the other half of the RF component of the electrical signal is mixed by the second mixer such that the quadrature phase signal component is produced.

\* \* \* \* \*